No. 797,726. PATENTED AUG. 22, 1905.
E. T. FOSTER.
AXLE LOCK NUT.
APPLICATION FILED OCT. 17, 1904.
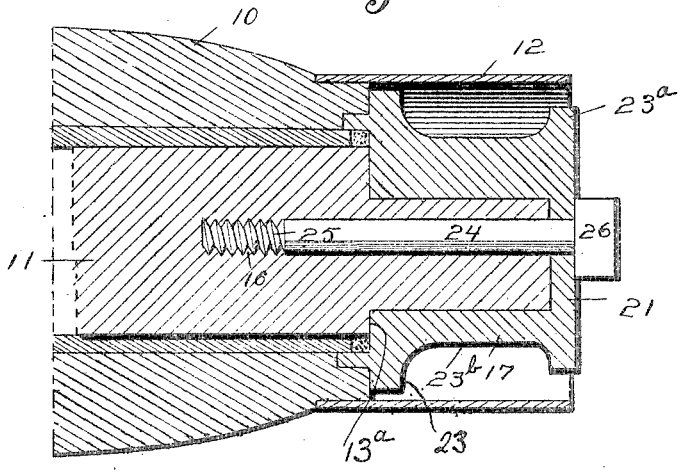
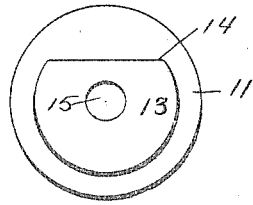
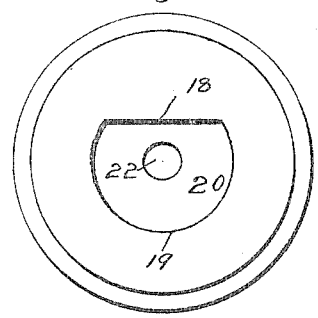
Witnesses
A. G. Hague
S. F. Christy
Inventor E. T. Foster.
By Orwig & Lane Attys

UNITED STATES PATENT OFFICE.

ERNEST T. FOSTER, OF WINTERSET, IOWA.

AXLE LOCK-NUT.

No. 797,726.           Specification of Letters Patent.           Patented Aug. 22, 1905.

Application filed October 17, 1904. Serial No. 228,693.

*To all whom it may concern:*

Be it known that I, ERNEST T. FOSTER, a citizen of the United States, residing at Winterset, in the county of Madison and State of Iowa, have invented a certain new and useful Axle Lock-Nut, of which the following is a specification.

The objects of my invention are to provide a nut for vehicle-axles which is not rotatable on the axle or which is not screwed to it, but is maintained in position relative to the axle by an auxiliary bolt which passes through the nut and into the axle.

A further object is to provide a nut which can be easily and quickly removed by the use of a wrench at the same time the bolt is unscrewed. This is accomplished by my particular arrangement of nut and bolt and the way of mounting the two relative to each other and of mounting the nut relative to the axle.

A further object is to provide a device of this class of simple, durable, and inexpensive construction which can be easily adapted for use on the ordinary axle.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1 is a sectional view of a portion of the hub of a wheel and a portion of the axle, showing my nut in position on the hub and my bolt for locking the nut relative to the axle. Fig. 2 is an end view of the axle with the nut and bolt for securing the nut in position removed, and Fig. 3 is a view of the inner end of the nut removed from the axle.

Referring to the accompanying drawings, I have used the reference-numeral 10 to indicate the ordinary hub of a wheel, which is mounted on the axle 11. This hub has the ordinary circular metal portion 12 at its outer end, inside of which the nut on the axle is maintained. The outer end 13 of the axle is slightly smaller than the body portion thereof to afford a shoulder 13$^a$. The upper portion of this smaller outer end 13 is flattened at 14 on its upper surface. Extending from the extreme outer end of the axle inwardly a considerable distance is an opening 15, which is screw-threaded at its inner end, as indicated by 16, to receive a screw-threaded bolt to be hereinafter described. Mounted on the smaller outer end 13 of the axle 11 is the nut 17. This nut is cut away from its interior portion outwardly in such a way that the flat surface 18 is formed and a curved surface 19 is provided to form the opening 20, which leads into it from its inner portion outwardly, leaving a thin metallic portion 21 at its outer end, through which a small circular opening 22 passes, which is designed to receive the bolt, to be hereinafter described. The flattened surface 18 on the interior of the nut and the curved portion 19 on the interior of said nut are so arranged and shaped that they will fit over the small end 13 of the axle, and on account of the flat surfaces 18 and 14 coming together there will be no rotation of the nut on the axle, nor is the nut capable of a rotary movement on the axle at any time. It can, however, be slipped on or withdrawn from the axle. Extending around the inner end of the nut is an annular rim 23, which is designed to rest against the shoulder of the axle and the hub of the wheel to hold said hub in position on the axle without undue friction.

Extending around the extreme outer end of the nut 17 is the annular rim 23$^a$, which is designed to be engaged by an implement for removing the nut from the axle. Extending through the opening 22 in the nut 17 and into the opening 15 of the axle 11 is a bolt 24, having a screw-threaded portion 25 on the inner end thereof and the head 26 at the outer end thereof. When the bolt 24 is slipped into the opening 15 and its inner end is in engagement with the screw-threaded portion 16 of the axle and the bolt is turned by turning the head 26 thereof, the screw-threaded portion 25 will enter the screw-threaded portion 16 and hold the bolt 24 in position in the axle, and consequently hold the nut 17 in position relative to the axle 11 and the wheel in position relative to the axle. In practical use there is no danger of this nut being worked loose, owing to the fact that there is no movement against the inner face of the head 26 that would tend to unscrew the bolt 24.

It will also be noted that the rim 23 of the nut 17 extends to a point adjacent to the inner side of the hub portion 12 and that the nut has a circumferential groove 23$^b$ intermediate the rims 23 and 23$^a$. In virtue of this construction it will be observed that dust, dirt, &c., will be caught in the groove 23$^b$ and will be effectually prevented from entering between the axle and the hub.

I am well aware that each of the elements of my novel device is old when separately considered, and I therefore make no claim to the same or to anything less than my complete novel and advantageous combination of elements.

What I claim is—

The combination with an axle having a reduced end portion, of angular form in cross-section, and a shoulder at the inner end of said reduced portion and also having a longitudinal, smooth bore terminating at its inner end in a threaded bore, a hub mounted on the axle and having its outer end arranged flush with the shoulder thereof, a circular portion carried by the hub and surrounding and extending beyond the reduced end portion of the axle, an endwise-slidable nut having an opening, of angular form in cross-section, receiving the reduced end portion of the axle and also having a smaller opening in its outer end registered with the bore in the axle; said nut being disposed within the circular portion on the hub, with its inner end against the flush hub end and axle-shoulder, and having inner and outer rims and a circumferential groove intermediate said rims, and a smooth bolt extending through the small opening in the end of the nut and into the bore in the axle and having a reduced and threaded inner end and a head, on its outer end, bearing against the outer end of the nut.

ERNEST T. FOSTER.

Witnesses:
   CHERRY L. HYDE,
   NOTA V. STARK.